W. R. WATROUS.
MANUFACTURE OF MANICURE SCISSORS.
APPLICATION FILED APR. 2, 1918.

1,285,852.

Patented Nov. 26, 1918.
2 SHEETS—SHEET 1.

INVENTOR.
William R. Watrous,
BY
Arthur B. Jenkins,
ATTORNEY.

W. R. WATROUS.
MANUFACTURE OF MANICURE SCISSORS.
APPLICATION FILED APR. 2, 1918.
1,285,852.
Patented Nov. 26, 1918.
2 SHEETS—SHEET 2.
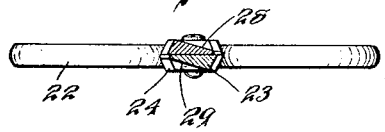
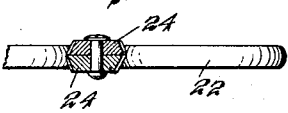
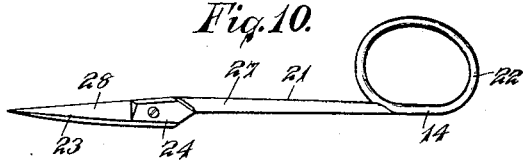
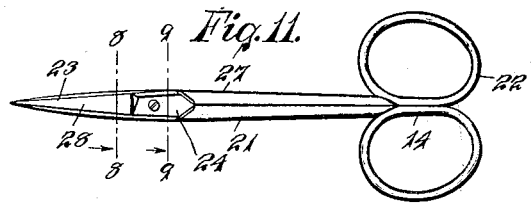
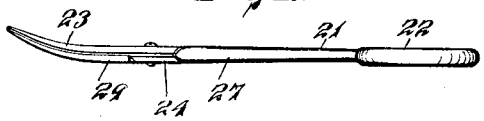

UNITED STATES PATENT OFFICE.

WILLIAM R. WATROUS, OF CHESTER, CONNECTICUT, ASSIGNOR TO C. J. BATES & SON, OF CHESTER, CONNECTICUT, A FIRM COMPOSED OF CARLTON C. BATES AND HAMILTON C. BATES.

MANUFACTURE OF MANICURE-SCISSORS.

1,285,852.    Specification of Letters Patent.   Patented Nov. 26, 1918.

Application filed April 2, 1918. Serial No. 226,135.

*To all whom it may concern:*

Be it known that I, WILLIAM R. WATROUS, a citizen of the United States, residing at Chester, in the county of Middlesex and State of Connecticut, have invented a new Improvement in the Manufacture of Manicure-Scissors, of which the following is a specification.

My invention relates to the subject above named and an object of my invention, among others, is to simplify the methods heretofore employed in the manufacture of manicure scissors and also to reduce the cost of such manufacture.

The different forms imparted to the blank during the different steps employed in my improved method are illustrated in the drawings, in which—

Figure 1:
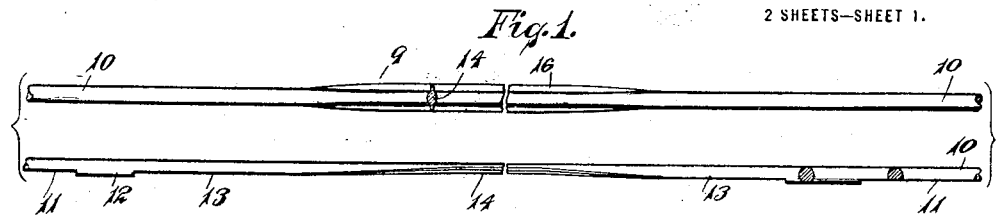
Figure 1 is a face and edge view of a portion of a rod illustrating a preliminary step in my improved process.

Figs. 8 and 9 are views (scale enlarged) in cross section on planes denoted by dotted lines 8—8 and 9—9 respectively of Fig. 11.

Fig. 10 illustrates one of the members of a pair of scissors after the flash, as produced by the action of the dies, has been removed.

Fig. 11 shows the completed scissors.

Fig. 12 is an edge view of the same.

Manicure scissors heretofore sold and used in this country have been of foreign make for the reason that the production of like articles in this country would be too expensive. Attempts have been made to overcome this objection, but with a result that the scissors thus produced have been coarse and unsightly in appearance and for this reason have not met with favor with the users thereof. My invention, however, overcomes these objections as to appearance of the scissors, and I am enabled, by the practice of my invention, not only to produce scissors at a comparatively low cost but at the same time to produce such as shall compare favorably with any of those heretofore put upon the market.

In carrying out my idea I first take a rod of stock which has been cold rolled and, therefore, quite bright in appearance. This round rod is subjected by me to the action of dies by which a number of sections are produced along the length of the wire, each section 9 containing a length sufficient to produce two members of a pair of scissors. Each section contains a portion 10 at each end that is flattened on the side 11, the part 12 of the section next to the flattened portion 11 being of the full round form of the original wire. The shank portion 13 is also flattened in a manner similar to the portion 11, and the center of the section is reduced to the thin oval form 14. This section of wire being severed at approximately its center, one-half of the oval portion 14 will be sufficient to form the bow on each of the members of the scissors to be produced from the section.

Figure 2:
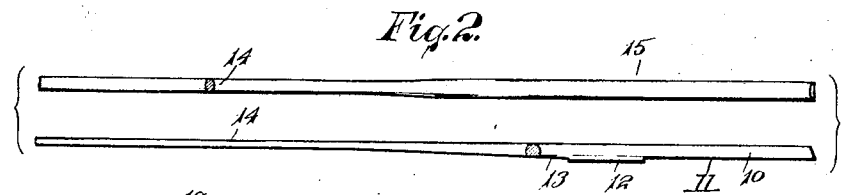
Fig. 2 is a similar view showing a length of the rod sufficient to produce one member of a pair of scissors.
Figure 3:
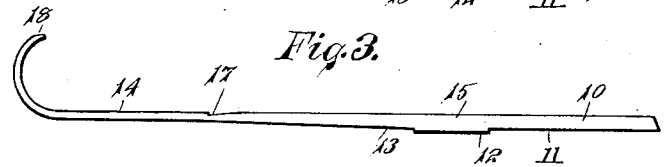
Fig. 3 is an edge view of a piece of metal showing the bow partially formed and the notch to receive its end.
Figure 4:
Fig. 4 is a view similar to Fig. 3 but showing the bow approximately completely bent.
Figure 5:
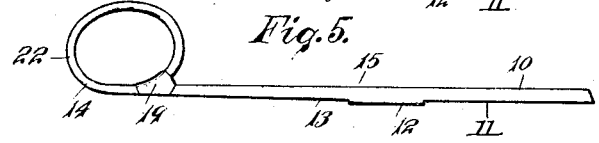
Fig. 5 is a view similar to Fig. 4 but showing the end of the bow secured as by brazing or other means.
Figure 6:
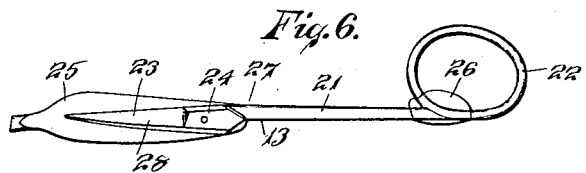
Fig. 6 illustrates the condition of the piece of metal shown in Fig. 5, after it has been subjected to the action of dies.

The section 9 being severed at approximately its center, two scissors members are produced of similar shape, one of which members 15 is shown in Fig. 2 of the drawings, which member is of the same shape as each half of the section shown in Fig. 1. The flash 16, produced in the formation of these sections, is removed, after the sections have been severed to produce the members, a member being illustrated with the flash removed in Fig. 2. A notch 17 may be formed in one side of each member and the tapered end 18 of the member may be bent around and placed in the notch, as illustrated in Figs. 3 and 4. Any suitable means may be employed for securing the end of the bow in the notch, as brazing, soldering or the like, such means being applied more or less in the form of a lump 19.

Figure 7:
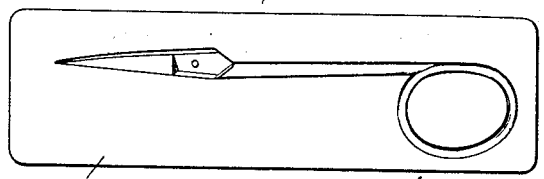
Fig. 7 is a face view of a die showing its form as related to the blank shown in Fig. 6.

The member 15 is then subjected to the action of dies the lower one 20 of which is illustrated in Fig. 7. The recesses in these dies are of substantially the size and shape of the shank 21 and bow 22 of the scissors, and when the dies are forced together any little variation from the ultimate shape will be corrected in the shank and bow so that no force is required to shape these parts, the approximate shape having been acquired in the previous operations.

In this action of the dies the part 10 of the member 15 is reduced to the form of a blade 23 and the part 12 is shaped by the dies to produce the mating portion 24 of the member. The flashes 25 and 26 are then removed and a scissors member 27 results, two of which joined in the ordinary manner comprise a pair of manicure scissors shown in Fig. 11. The entire operations contemplated by my invention herein set out are performed with the metal in a cold state with a result that the brightness of the metal obtained by the cold ordinary rolling of the wire is maintained throughout the entire operation, and, consequently, when the scissors are united, as shown in Fig. 9, they are substantially in a finished state, but very little finishing, as by polishing, being required, and this mainly to remove the roughness caused by the flashes produced by the dies, and the scissors thus produced are extremely sightly and neat in appearance.

In forming the members 15 by means of the rolls I not only provide sufficient metal for the formation of certain parts of the blank, but the different portions are also partially formed to simplify the operation of the dies. The flattening of the portions 10 enables the dies to readily give the beveled shapes 28 and 29, either to the upper or under side of a member 15 to properly form a part of each of such members to comprise one member of a pair of scissors, it being noted, as shown in Figs. 8 and 9, that the upper portion of one member and the under portion of the opposite member are beveled.

In accordance with the provisions of the patent statutes, I have described the principles of operation of my invention, together with the device which I now consider to represent the best embodiment thereof; but I desire to have it understood that the device shown is only illustrative and that the invention may be carried out by other means within the scope of the appended claims.

I claim—

1. A blank for manicure scissors comprising sections, each section including a central portion of oval form and of a length to produce a bow for two scissors members, portions flattened on one side at opposite ends of said oval portion, and parts round in cross section at the outer end of each of said flattened parts, the extremities of the blank being flattened on one side.

2. A blank for manicure scissors comprising a round portion, a portion flattened on one side at each end of the round portion, and a portion of oval shape in cross section at one end of the blank.

3. A blank for manicure scissors comprising a portion of round shape in cross section with parts on opposite ends thereof flattened on one side, one of said flattened portions being longer than the other and terminating in a piece of oval shape in cross section.

4. A blank for manicure scissors comprising a portion round in cross section at one part with portions flattened on one side and located at opposite ends of the round portion, one of said flattened parts being longer than the other and gradually merging into an extremity of thin oval shape in cross section.

5. The process of forming a blank member for manicure scissors that consists in flattening a round piece of wire for a short distance, omitting an operation next to said flat portion leaving the blank round thereat, flattening a portion next to the round portion, producing an oval portion next to the flat portion, and then reversing the operation along said piece of wire.

6. A blank for manicure scissors comprising a round portion, a portion flattened on one side at an end of the round portion, and a portion of oval shape in cross section at one end of the blank.

7. The process of forming a blank member for manicure scissors that consists in producing a blank having an enlarged round portion, a reduced shank portion next to the round portion, a bow portion of oval shape in cross section; bending the bow portion and securing its end to the main part; then subjecting the blank to the action of dies to reduce the blade and mating portions and the united part only; and then finishing the blank.

8. The process of forming a blank member for manicure scissors that consists in producing a member with one side flattened at one end, a round portion next to said flattened portion, another flattened portion next to said round portion, and an oval shaped bow portion; bending said bow portion and securing its ends to the main part; and then subjecting said blank to the action of dies to reduce the blade, mating and united portions only; and then finishing the blank.

9. The process of forming a blank member for manicure scissors that consists in subjecting a round piece of wire to the action of rolls to produce a portion flattened on one side on opposite sides of a round portion, a bow portion of oval shape in cross section at one end; bending the bow portion to form a bow and securing its free end to the main part; then subjecting the blank to the action of dies that reduce the blade and united portions only and correct the form of the shank and bow portions.

10. The process of forming a blank member for manicure scissors that consists in reducing a round piece of wire to blade and shank portions flattened on one side and a bow portion of oval shape in cross section; bending the bow part to final form and securing its end; and then reducing the brazed and blade portions only to complete the bow and form the blade; and then finishing the blank.

11. The process of forming a blank member for manicure scissors that consists in subjecting a round piece of wire to an operation to produce a blade and shank portions flattened on one side and on opposite sides of a round portion, and a bow portion of oval shape in cross section at one end of one of said flattened portions; bending the bow and securing its ends to the main part of the member; and reducing one flattened portion and the round portion to form the blade and mating portions of the blank; and then finishing the blank.

12. The process of forming a blank member for manicure scissors that consists in subjecting a piece of wire to an operation to produce substantially a round portion between two portions flattened on one side, and a bow portion of oval shape in cross section.

WILLIAM R. WATROUS.

Copies of this patent may be obtained for five cents each, by addressing the "Commissioner of Patents, Washington, D. C."